United States Patent
Chun et al.

(10) Patent No.: US 7,085,943 B2
(45) Date of Patent: Aug. 1, 2006

(54) METHOD AND CIRCUITRY FOR CONTROLLING SUPPLY VOLTAGE IN A DATA PROCESSING SYSTEM

(75) Inventors: Christopher K. Y. Chun, Austin, TX (US); Wayne W. Ballantyne, Coconut Creek, FL (US); Gordon P. Lee, Mesa, AZ (US); Scott A. Tassi, Boca Raton, FL (US); Darren V. Weninger, Chandler, AZ (US)

(73) Assignee: Freescale Semiconductor, Inc., Austin, TX (US)

(*) Notice: Subject to any disclaimer, the term of this patent is extended or adjusted under 35 U.S.C. 154(b) by 382 days.

(21) Appl. No.: 10/672,161

(22) Filed: Sep. 26, 2003

(65) Prior Publication Data

US 2005/0071693 A1  Mar. 31, 2005

(51) Int. Cl.
*G06F 1/26* (2006.01)
(52) U.S. Cl. .................................. 713/300
(58) Field of Classification Search ........... 713/300
See application file for complete search history.

(56) References Cited

U.S. PATENT DOCUMENTS

| | | |
|---|---|---|
| 6,501,253 B1 | 12/2002 | Marty |
| 6,691,235 B1 * | 2/2004 | Garcia et al. ............. 713/300 |
| 6,748,545 B1 * | 6/2004 | Helms ....................... 713/300 |
| 2002/0190797 A1 | 12/2002 | Deppe et al. |
| 2003/0071657 A1 | 4/2003 | Soerensen et al. |

OTHER PUBLICATIONS

"OMAP5910 Dual-Core Processor Clock Generation and System Reset Management Reference Guide"; Texas Instruments Web Site; Oct. 2003; 102pp (see e.g. Section 2.8); Texas Instruments.
Power IC's Databook,, 1995 Edition; p. 1-20; National Semiconductor.

* cited by examiner

Primary Examiner—Chun Cao
Assistant Examiner—Albert Wang
(74) Attorney, Agent, or Firm—Joanna G. Chiu

(57) ABSTRACT

Supply voltages within a data processing system may be controlled by a voltage control module which can provide digital signals to a power management unit to cause changes in supply voltages without software intervention. For example, in one embodiment, a voltage control signal and a standby signal may be provided to control the supply voltages output by a voltage regulator within the power management unit. In one embodiment having multiple processors, a voltage control signal and a standby signal corresponding to each processor may be provided to the power management unit which has a voltage regulator supplying an independently controlled supply voltage to each processor. Alternatively, a voltage regulator, a voltage control signal, and a standby signal may be shared by multiple processors, where the voltage control module may ensure that the supply voltage is changed only when the change is appropriate for all processors sharing the same voltage regulator.

22 Claims, 4 Drawing Sheets

METHOD AND CIRCUITRY FOR CONTROLLING SUPPLY VOLTAGE IN A DATA PROCESSING SYSTEM

FIELD OF THE INVENTION

The present invention relates to data processing systems, and more particularly, to controlling supply voltage within the data processing system.

RELATED ART

Lower power consumption has been gaining importance in data processing systems, due, for example, to wide spread use of portable and handheld applications. Therefore, many systems today use dynamic voltage/frequency scaling (DVFS) in order to reduce supply voltages and conserve power, when possible. DVFS may be implemented at a system level rather than on-chip in order to control the supply voltages and clock frequencies of a system. In one known DVFS implementation, a system includes a power management integrated circuit (IC) and a core where the power management IC communicates with the core via a communication channel such as a Serial Peripheral Interface (SPI) port or an I²C (inter-IC) port. In order to use the communication channel to control the supply voltages during operation of the system, the communication channel must be established prior to each data transfer. However, having to set up or establish the communication channel for each data transfer wastes time and power. Furthermore, the use of a communication channel such as the SPI or I²C also assumes that the core is active and capable of sending the data. In some cases, the core may be in an ultra-low power state and unable to generate an SPI or I²C message. Therefore, a need exists for an improved method for controlling supply voltage that, for example, requires less power and does not rely on the core being active.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As will be described herein, supply voltages within a data processing system may be controlled by a voltage control module which can provide digital signals to a power management unit to cause changes in supply voltages without software intervention. For example, in one embodiment, a voltage control signal and a standby signal may be provided to control the supply voltages output by a voltage regulator within the power management unit. In one embodiment having multiple processors or circuit portions, a voltage control signal and a standby signal corresponding to each processor or circuit portion may be provided to the power management unit which has a voltage regulator supplying an independently controlled supply voltage to each processor or circuit portion. In an alternate embodiment, a voltage regulator, a voltage control signal, and a standby signal may be shared by multiple processors or circuit portions, where the voltage control module may ensure that the supply voltage is changed only when the change is appropriate for all processors or circuit portions sharing the same voltage regulator.

Figure 1:
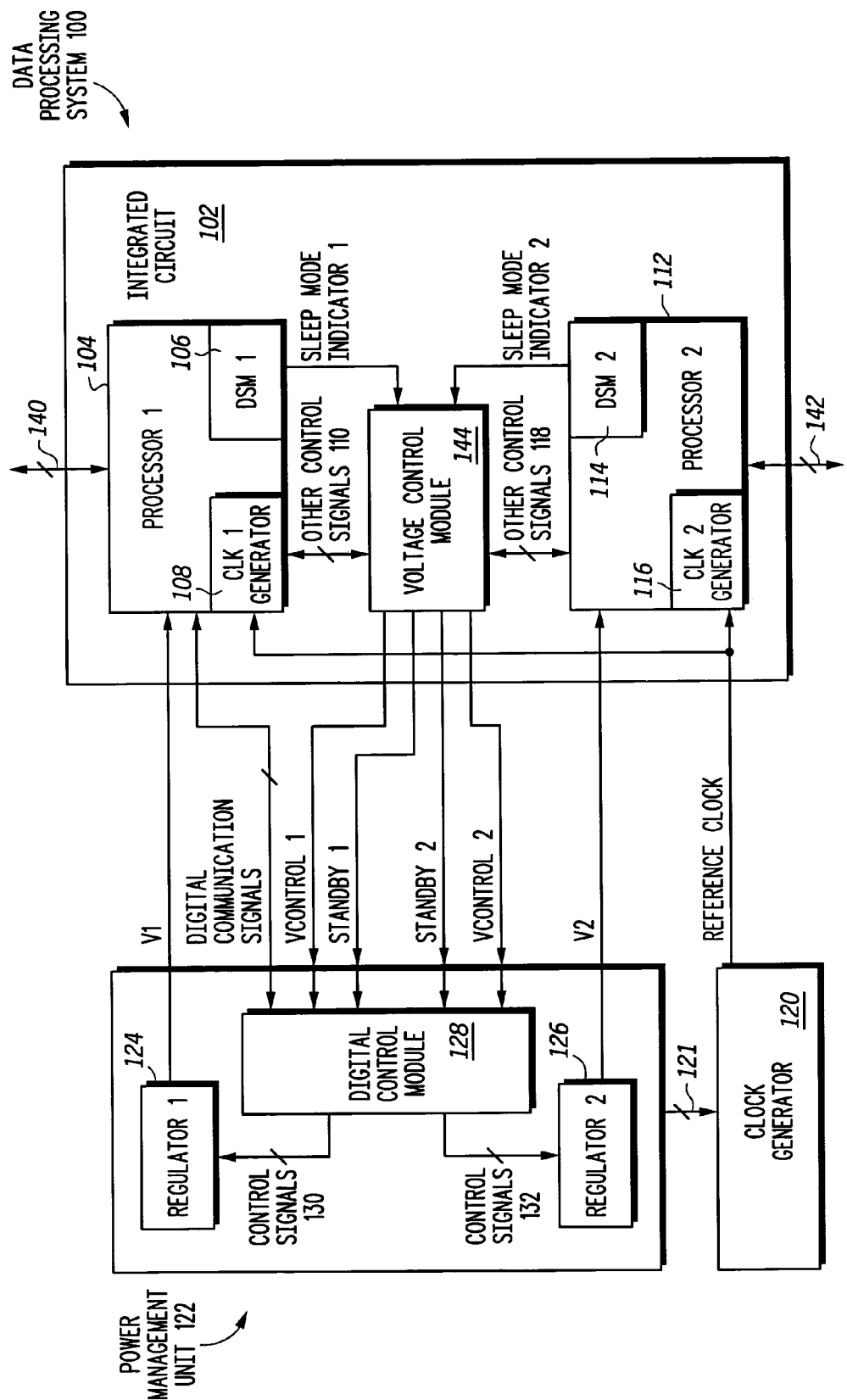
FIG. 1 illustrates, in block diagram form, a data processing system in accordance with one embodiment of the present invention.

FIG. 1 illustrates a data processing system 100 in accordance with one embodiment of the present invention. Data processing system 100 includes a power management unit 122, an integrated circuit (IC) 102, and a clock generator 120. IC 102 provides Vcontrol 1, Vcontrol 2, Standby 1, Standby 2 to power management unit 122 and receives V1 and V2 from power management unit 122. IC 102 and power management unit 122 also communicate via digital communications signals. Clock generator 120 is coupled to power management unit 122 and provides a reference clock to IC 102.

IC 102 includes processor 1 104, processor 2 112, and voltage control module 144. Processor 1 104 includes a clock (clk) 1 generator 108 and a deep sleep module (DSM) 1 106. Processor 1 104 is coupled to voltage control module 144 via other control signals 110. Also, DSM 1 106 provides a sleep mode indicator 1 to voltage control module 144. Processor 2 112 includes a clk 2 generator 116 and a DSM 2 114. Processor 2 112 is coupled to voltage control module 144 via other control signals 118. Also, DSM 2 114 provides a sleep mode indicator 2 to voltage control module 144. Processor 1 104 may provide or receive signals to or from external circuitry via integrated circuit terminals 140 and processor 2 112 may provide or receive signals to or from external circuitry via integrated circuit terminals 142.

Note that in the illustrated embodiment, IC 102 includes two processors (processor 1 104 and processor 2 112). However, in alternate embodiments, IC 102 may include any number of processors. In one embodiment, processor 1 104 may be a digital signal processor (DSP) and processor 2 112 may be an application processor. Each of processors 104 and 112 may include a core or central processing unit (CPU) and any number of peripherals, as known in the art. Alternatively, each of processors 104 and 112 may be any type of processors and may include any type of circuitry to perform different functions, as desired. In one embodiment, IC 102 may be a baseband IC within, for example, a communication device. However, note that in alternate embodiments, IC 102 may be used in a variety of different products. Furthermore, IC 102 may actually be any number of ICs coupled together. For example, processor 1 104 may be located on a different IC than processor 2 112. Similarly, voltage control module 144 may, in an alternate embodiment, be located on a separate IC from either processor 1 104 or processor 2 112. Therefore, one of ordinary skill in the art may appreciate that there are a variety of configurations that may be used, and IC 102 is only one example.

Voltage control module 144 receives sleep mode indicator 1 and sleep mode indicator 2, and any other signals via other control signals 110 and 118, and provides Vcontrol 1, Standby 1, Standby 2, and Vcontrol 2 to power management unit 122. Power management unit 122 includes a digital control module 128, a regulator 1 124 and a regulator 2 126. Digital control module 128 receives Vcontrol 1, Standby 1, Standby 2, and Vcontrol 2 and provides control signals 130 to regulator 1 124 and control signals 132 to regulator 2 126. Regulator 1 124 provides a supply voltage V1 to processor 1 104 and regulator 2 126 provides a supply voltage V2 to processor 2 112. Power management unit 122 provides control signals to clock generator 120 which provides a reference clock to clk 1 generator 108 and clk 2 generator 116.

In one embodiment, power management unit 122 is located on a separate IC from IC 102. However, in an alternate embodiment, power management unit 122 may be located on a same IC as IC 102. Similarly, in the illustrated embodiment, clock generator 120 is located on a separate IC from IC 102 and power management unit 122, but in an alternate embodiment, clock generator 120 may be located on a same IC as power management unit 122 or IC 102.

In operation, processor 1 104 and processor 2 112 may operate as known in the art. For example, processor 1 104 may include a core and peripherals to perform many types of functions. In the embodiment of FIG. 1, all of processor 1 104 receives supply voltage V1. In alternate embodiments, portions of processor 1 104 may receive different supply voltages, or may generate different supply voltages based on V1. For example, the core of processor 1 104 may operate at one supply voltage while some of the peripherals may operate at another supply voltage. Clk 1 generator 108 receives the reference clock from clock generator 120 and produces the necessary clock signals for processor 1 104 based on the reference clock. In one embodiment, processor 1 104 includes various different clock domains such that different clocks, having different frequencies, are provided by clk 1 generator 108 to the different clock domains.

Processor 2 112 may also include a core and peripherals to perform many types of functions. In the embodiment of FIG. 1, all of processor 2 112 receives supply voltage V2. In alternate embodiments, portions of processor 2 112 may receive different supply voltage, or may generate different supply voltage based on V2. Clk 2 generator 116 receives the reference clock from clock generator 120 and produces the necessary clock signals for processor 2 112 based on the reference clock. In one embodiment, as described above in reference to processor 1 104, processor 2 112 includes various different clock domains supplied by clk 2 generator 116.

Processor 1 104, or a portion of processor 1 104 (such as, for example, the core of processor 1 104) may request that processor 1 104 enter a deep sleep mode in order to conserve power. DSM 1 106 may receive the deep sleep mode request and determine whether processor 1 104 or portions of processor 1 104 can enter deep sleep mode. If so, DSM 1 106 asserts sleep mode indicator 1 to indicate to voltage control module 144 that processor 1 104 is to enter deep sleep mode. Similarly, processor 2 112, or a portion of processor 2 112 (such as, for example, the core of processor 2 112) may request that processor 2 112 enter a deep sleep mode in order to conserve power. DSM 2 114 may receive the deep sleep mode request and determined whether processor 2 112 or portions of processor 2 112 can enter deep sleep mode. If so, DSM 2 114 asserts sleep mode indicator 2 to indicate to voltage control module 144 that processor 2 112 is to enter deep sleep mode.

Voltage control module 144, based on sleep mode indicator 1 and sleep mode indicator 2 can then determine whether the reference clock can be turned off. For example, if all processors (e.g. both processors 1 and 2) request to enter deep sleep mode, then the reference clock may be turned off such that processor 1 104 and processor 2 112 no longer receive clocks. In this case, voltage control module 144 may provide power management unit 122 with an indication that IC 102 is to enter a deep sleep mode (i.e. a standby mode), and power management unit 122 is capable of indicating to clock generator 120 via signals 121 to turn off the reference clock. (Note that operation of voltage control module 144 and power management unit 122 will be discussed in more detail in reference to FIGS. 2–7 below.) However, if less than all processors (e.g. only processor 1 or 2) requests to enter deep sleep mode, then voltage control module 144, via other control signals 110 or 118, can turn off the clocks from clk 1 generator 108 or clk 2 generator 116, depending on which processor provided the request to enter deep sleep mode, while not affecting the reference clock.

When a processor, such as processor 1 104 or processor 2 112, enters deep sleep mode, note that all of the processor or only portions of the processor may enter deep sleep mode. For example, there are portions of the processor that may need to receive a clock and power at all times in order to retain information, such as, for example, state information. Also, generally DSM 1 106 and DSM 2 114 remain operating at all times so that they may wake up the processors from deep sleep mode. For example, in one embodiment, both a high frequency reference clock (e.g. 16.8 MHz) and a lower frequency reference clock (e.g. 32 kHz) may be generated (such as, for example, by clk 1 generator 108, clk 2 generator 116, or clock generator 120), where the lower frequency reference clock is provided to those portions of data processing system 100 that need to be operating at all times. In this embodiment, when entering deep sleep mode, the high frequency reference clock (and not the lower frequency clock) is disabled such that those portions that need to remain in operation continue to operate, but on the lower frequency clock, which conserves power. Also, during deep sleep mode, the supply voltages such as V1 and V2 may also be reduced to save power. Control of these supply voltages during operation and for deep sleep mode will be discussed below in reference to FIGS. 2–7.

Still referring to FIG. 1, in order to conserve power, voltage control module 144 may be used to reduce supply voltages V1 and V2. For example, during operation, a reduced power mode may be entered in which the supply voltages may be lowered. In one embodiment, a supply voltage of 1.4V may correspond to a high operating voltage or fully powered while a supply voltage of 1.2V may correspond to a low operating voltage or a low power mode. Also, in this embodiment, a supply voltage of 1.0V may be used during a deep sleep mode to further conserve power. In alternate embodiments, different values for the supply voltages may be used, depending on the design of the system. Voltage control module 144 may therefore control and change the supply voltages during operation of IC 102. For example, in the embodiment of FIG. 1, voltage control module 144 may provide Vcontrol 1 and Standby 1 to digital control module 128 which may then control regulator 1 124 to change the value of supply voltage V1. Similarly, voltage control module 144 may provide Vcontrol 2 and Standby 2 to digital control module 128 which may then control regulator 2 126 to change the value of supply voltage V2.

Note that in the illustrated embodiment of FIG. 1, there are two regulators for supplying V1 and V2. Therefore, each of V1 and V2 can be controlled and changed independently of each other. Alternate embodiments may include only one regulator that is shared between processor 1 104 and processor 2 112, such that both V1 and V2 are provided by a same regulator. Alternatively, power management unit 122 may include any number of regulators to provide any number of different supply voltages that may be independently controlled. For example, multiple regulators may be used to supply multiple supply voltages for processor 1 104 such that different portions of processor 1 104 may received different, independently controlled, supply voltages. Therefore, power management unit 122 can include any number of regulators depending on how many processors or independently controllable supply voltages are desired within system 100.

Figure 2:
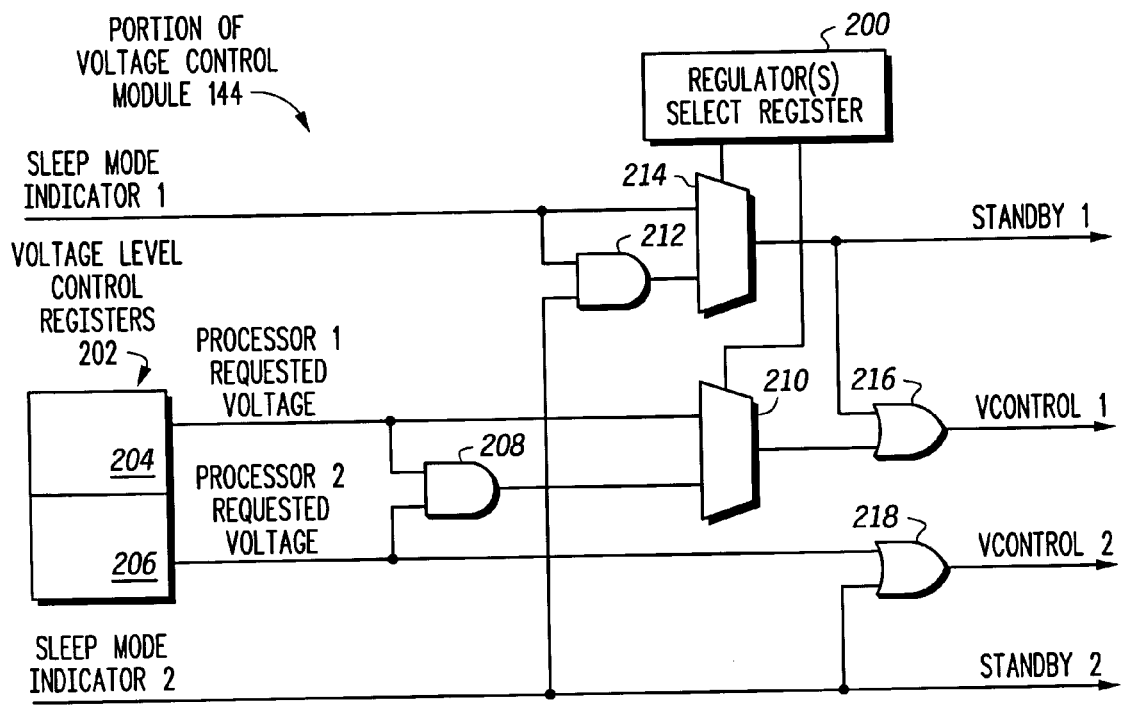
FIG. 2 illustrates, in block diagram form, a portion of the voltage control module of FIG. 1, in accordance with one embodiment of the present invention.

FIG. 2 illustrates one embodiment of a portion of voltage control module 144 of FIG. 1. The embodiment of FIG. 2 can be used within a system having one or two regulators. In FIG. 2, sleep mode indicator 1 is provided as a first input to a multiplexer (MUX) 214 and an AND gate 212. The output of AND gate 212 is provided as a second input to MUX 214. The output of MUX 214 is provided as output Standby 1 and as a first input to an OR gate 216. Sleep mode indicator 2 is provided as a second input to AND gate 212, as a first input to OR gate 218, and as output Standby 2. Voltage control module 144 also includes voltage level control registers 202 (also referred to as control storage circuitry) having a first register 204 and a second register 206. Register 204 provides processor 1 requested voltage as a first input to MUX 210 and a first input of an AND gate 208. Register 206 provides processor 2 requested voltage as a second input to AND gate 208 and as a second input to OR gate 218. The output of AND gate 208 is provided as a second input to MUX 210, and the output of MUX 210 is provided as a second input to OR gate 216. The output of OR gate 216 provides an output Vcontrol 1 and the output of OR gate 218 provides an output Vcontrol 2. Regulator(s) select register 200 provides control signals to MUX 214 and MUX 210.

In operation, voltage level control registers 202 store the requested voltage levels of processors 1 and 2. For example, in one embodiment, each registers 204 and 206 store a one bit value to indicate one of two different supply voltage levels. In one embodiment, a logic level 0 indicates a higher supply voltage level (such as, for example, 1.4V) and a logic level 1 indicates a lower supply voltage level (such as, for example, 1.2V). Alternate embodiments may use a multi-bit value to indicate one of a plurality of different possible supply voltage levels.

In the illustrated embodiment, voltage control module 144 can be configured to work with either one regulator or two. Regulator(s) select register 200 may be programmed (via, for example, other control signals 110 or 118) to indicate whether one or two regulators are being used within power management unit 122. If two regulators are used, then the value of register 200 is set so as to select the first inputs of MUXes 214 and 210 to be provided as the outputs of MUXes 214 and 210, respectively. In this manner, sleep mode indicator 1 is provided directly as standby 1 and processor 1 requested voltage is ORed with Standby 1 to provide Vcontrol 1. Since there are two regulators, note that Standby 1 and Vcontrol 1 are provided independent of sleep mode indicator 2 and processor 2 requested voltage. In the illustrated embodiment, when Standby 1 is asserted (a logic level 1), then Vcontrol 1 is also asserted (a logic level 1). When Standby 1 is not asserted, then Vcontrol 1 is whatever value is indicated by processor 1 requested voltage. Therefore, in one embodiment, a logic level 0 for Vcontrol 1 may indicate a higher supply voltage level (such as, for example, 1.4V) and a logic level 1 may indicate a lower supply voltage level (such as, for example, 1.2V). Note that for the case of two regulators, the description for Standby 2 and Vcontrol 2 are analogous to the descriptions for Standby 1 and Vcontrol 1.

Figure 6:
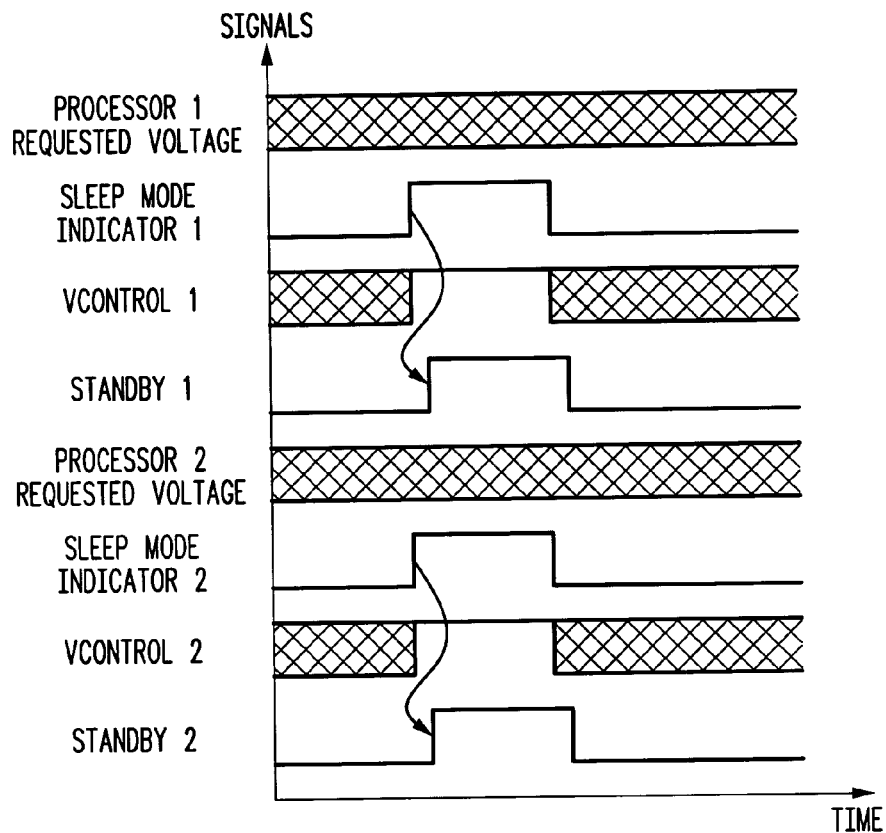
FIGS. 6 and 7 illustrate timing diagrams for various signals within the data processing system of FIG. 1 in accordance with various embodiments of the present invention.

For example, FIG. 6 illustrates a timing diagram for the signals processor 1 requested voltage, sleep mode indicator 1, Vcontrol 1, Standby 1, processor 2 requested voltage, sleep mode indicator 2, Vcontrol 2, and Standby 2 when power management unit 122 is operating with independent regulators for processor 1 104 and processor 2 112. Therefore, note that when sleep mode indicator 1 is asserted, Vcontrol 1 and Standby 1 are asserted (e.g. at the outputs of MUX 214 and OR gate 216). In one embodiment, both Vcontrol 1 and Standby 1 being asserted may be used to indicate a third desired supply voltage level. For example, during deep sleep mode (indicated by standby 1 being asserted), the supply voltage may be set to a lower voltage value, such as, for example, 1.0V. That is, the combination of Standby 1 and Vcontrol 1 both being asserted can be used to indicate a third voltage level, which may be stored, for example, within a register of power management unit 122. (In an alternate embodiment, Standby 1 and Vcontrol 1 may be used to indicate a fourth voltage level that may be requested during deep sleep mode. For example, the combination of Standby 1 being asserted and Vcontrol 1 not being asserted can be used to indicate the fourth voltage level.) In another alternate embodiment, though, the value of Vcontrol 1 may be treated as a "don't care" when sleep mode indicator 1 is asserted. For example, if the supply voltage is to be turned off during sleep mode or is to be maintained at its previous level, then it may not matter what the value of Vcontrol 1 is during a deep sleep mode since the supply voltage is either set to zero or maintained at its previous level. Note that the same descriptions provided for processor 1 requested voltage, sleep mode indicator 1, Vcontrol 1, and Standby 1 apply to processor 2 requested voltage, sleep mode indicator 2, Vcontrol 2, and Standby 2.

Referring back to FIG. 2, if one regulator is to be used, then value of register 200 is set so as to select the second inputs of MUXes 214 and 210. In this case, the output of AND gate 212 is provided as Standby 1 and the output of AND gate 208 is provided as the second input of OR gate 216. Also, in this embodiment, outputs V control 2 and Standby 2 are not needed and may therefore not be present or may be ignored by power management unit 122. In this embodiment, AND gates 212 and 208 are used to ensure that a lower supply voltage is not selected unless both processors request the lower supply voltage. For example, if processor 2 112 is running at the high supply voltage (such as, for example, 1.4V) and processor 1 104 wants to request a lower supply voltage (such as, for example, 1.2V, or a lower supply voltage associated with deep sleep mode), then voltage control module 144 does not allow Vcontrol 1 to indicate the lower supply voltage unless processor 2 112 also requests the lower voltage (this is accomplished, for example, by AND gate 208). Otherwise, if the supply voltage of the shared regulator is dropped to a lower supply voltage, processes and values within processor 2 112 may be damaged or lost due to the unexpected lowering of the supply voltage. Likewise, if processor 1 104 is running at the high supply voltage (such as, for example, 1.4V) and processor 2 112 requests a lower supply voltage (such as, for example, 1.2V, or a lower supply voltage associated with deep sleep mode), then voltage control module 144 does not allow Vcontrol 1 to indicate the lower supply voltage unless processor 1 104 also requests the lower voltage (this is accomplished, for example, by AND gate 208). Similarly, with a shared regulator, voltage control module 144 ensures that deep sleep mode is not entered unless both processor 1 104 and processor 2 112 request deep sleep mode (this is accomplished, for example, by AND gate 212).

Figure 7:
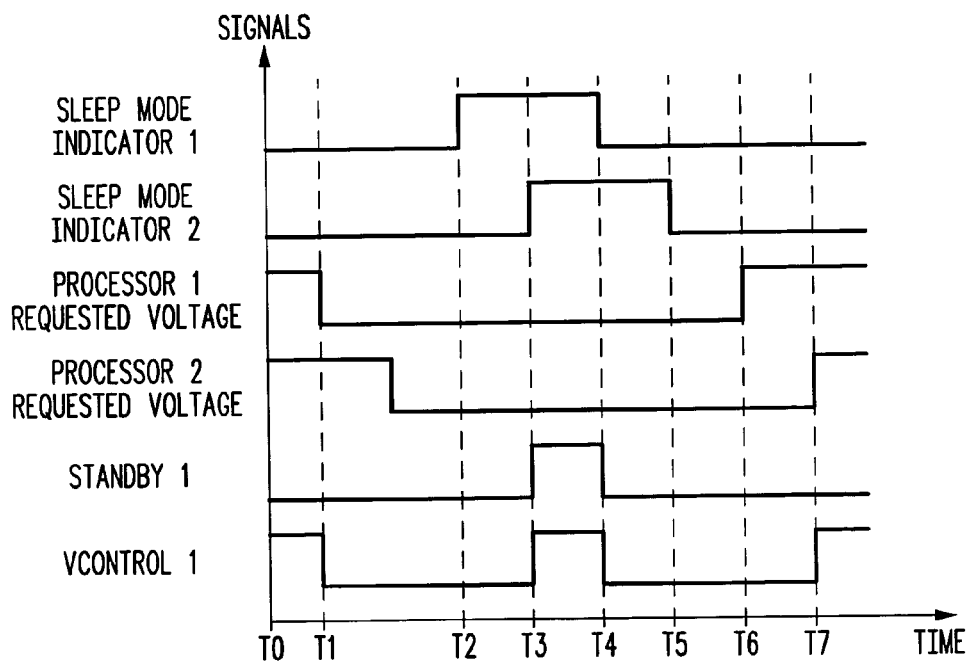

For example, FIG. 7 illustrates a timing diagram for the signals sleep mode indicator 1, sleep mode indicator 2, processor 1 requested voltage, processor 2 requested voltage, Standby 1, and Vcontrol 1 when power management unit 122 is operating with a shared regulator for processor 1 104 and processor 2 112. Therefore, in the timing diagram of FIG. 7, note that only outputs Standby 1 and Vcontrol 1 are illustrated since the outputs Standby 2 and Vcontrol 2 may be ignored (or, depending on the design of voltage control module 144, may not be present at all). At T0, both sleep mode indicators 1 and 2 are deasserted, thus Standby 1 is also deasserted (via, for example, AND gate 212 and MUX 214 of FIG. 2). Also, processor 1 requested voltage and processor 2 requested voltage are both a logic level 1, indicating a lower supply voltage (such as 1.2V) in this example. Since both processors 104 and 112 are requesting the lower supply voltage, Vcontrol 1 is at a logic level 1 (via, for example, AND gate 208, MUX 210, and OR gate 216 of FIG. 2) to indicate to the shared voltage regulator of power management unit 122 that the lower supply voltage is requested. At time T1, processor 1 104 requests the higher supply voltage so that it may, for example, run at full power. Therefore, processor 1 104 may store a logic level 0 to register 206 of voltage control module 144 in order to deassert processor 1 requested voltage. Since processor 1 104 is needing full power (or at least the higher supply voltage), Vcontrol 1 is deasserted so that the shared voltage regulator will output the higher voltage. In this manner, processor 1 104 may operate correctly (because processor 1 104 may require the higher supply voltage to perform its necessary functions).

At time T2, processor 1 104 asserts sleep mode indicator 1 requesting to enter a deep sleep mode. However, in this example, since processor 2 112 has not requested to enter a deep sleep mode, the supply voltage cannot be changed. Therefore, Standby 1 and Vcontrol 1 remain deasserted. At time T3, processor 2 112 asserts sleep mode indicator 2 requesting to enter a deep sleep mode. At this point, both processors have requested deep sleep mode; therefore, voltage control module 144 (via, for example, AND gates 208 and 212 of FIG. 2) asserts Standby 1 to indicate to power management unit 122 that a deep sleep mode may be entered. (For example, to allow IC 102 to enter standby mode.) Note that in this embodiment, Vcontrol 1 is also asserted when Standby 1 is asserted to indicate a desired supply voltage (such as, for example, 1.0V) during deep sleep mode. Alternatively, as was described above, Vcontrol can be deasserted to indicate another desired supply voltage, or may simply be treated as a "don't care" if no particular supply voltage is to be indicated by Vcontrol 1. (That is, the supply voltage during deep sleep mode may be set to zero, remain unchanged, or may be indicated in other ways.)

At time T4, processor 1 104 deasserts sleep mode indicator 1 to indicate that it needs to exit deep sleep mode. Even though processor 2 112 is able to remain in deep sleep mode (since sleep mode indicator 2 is still asserted), Standby 1 is deasserted to exit deep sleep mode so that processor 1 104 may operate as needed. Also, since processor 1 requested voltage is still deasserted, Vcontrol 1 is deasserted to indicate to power management unit 122 that the high supply voltage is needed.

At time T5, processor 2 requested operation at the higher supply voltage, indicated by the deassertion of sleep mode indicator 2 and the continued deassertion of processor 2 requested voltage. Vcontrol 1 therefore remains deasserted and operation continues at the higher supply voltage. At time T6, processor 1 104 requests (via register 204) to have the supply voltage reduced, thus processor 1 requested voltage is deasserted. However, Vcontrol 1 is not asserted again (to indicate the lower supply voltage) until time T7 when both processors 104 and 112 have requested the lower supply voltage, indicated by both processor 1 requested voltage and processor 2 requested voltage being deasserted.

Note that in alternate embodiments, timing diagram 7 may appear differently, depending on the circuitry of FIG. 2. Also, note that different embodiments may use different circuitry than that shown in FIG. 2 to implement similar functions. For example, voltage control module 144 may be designed such that regulator(s) select register 200 allows a selection from among more than 2 regulators. Alternatively, voltage control module 144 may be designed for a particular number of regulators (e.g. one or more regulators). Therefore, one of ordinary skill in the art can appreciate that there are a variety of different designs that may be used in implementing voltage control module 144.

Figure 3:
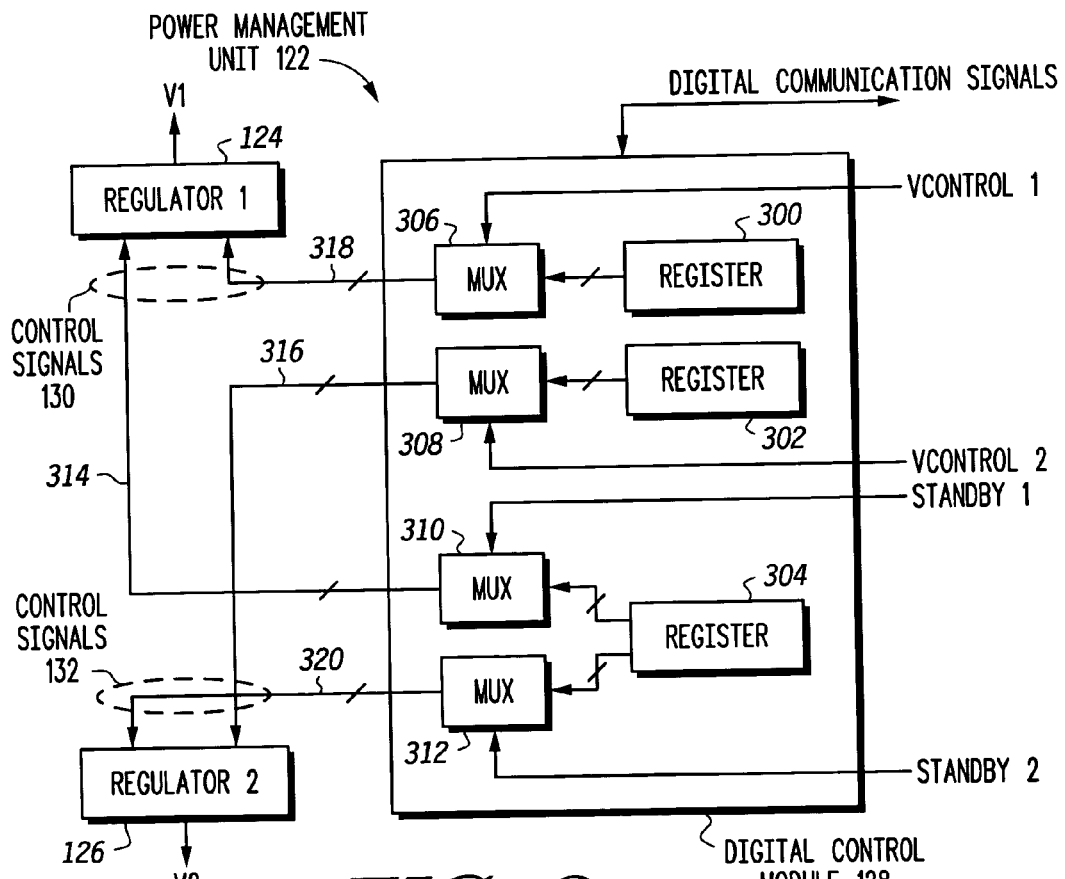
FIG. 3 illustrates, in block diagram form, the power management unit of FIG. 1 in accordance with one embodiment of the present invention.

Referring now to FIG. 3, FIG. 3 illustrates further details of power management unit 122 in accordance with one embodiment of the present invention. Digital control module 128 includes multiplexers (MUXes) 306, 308, 310, and 312, and registers 300, 302, and 304. MUX 306 receives Vcontrol 1 and is coupled to register 300. MUX 308 receives Vcontrol 2 and is coupled to register 302. MUX 310 receives Standby 1 and is coupled to register 304, and MUX 312 receives Standby 2 and is also coupled to register 304. Therefore, in one embodiment, Vcontrol 1, Vcontrol 2, Standby 1, and Standby 2 operate as the select control signals for MUXes 306, 308, 310, and 312, respectively. MUX 306 and MUX 310 provide information via conductors 318 and 314, respectively, to regulator 1 124. Note that conductors 314 and 318 form part of control signals 130. MUX 308 and MUX 312 provide information via conductors 316 and 320, respectively, to regulator 2 126. Note that conductors 316 and 320 form part of control signals 132. As illustrated in FIG. 1, regulator 1 124 provides supply voltage VI and regulator 2 126 provides supply voltage V2. Therefore, note that as in FIG. 1, the embodiment of FIG. 3 will also be described in reference to two independent regulators, one providing V1 to processor 1 104 and another providing V2 to processor 2 112. However, as was described above, in an alternate embodiment having only one regulator, then only MUX 306 and MUX 310, registers 300 and 304, and regulator 1 124 may be present. In other embodiments, more circuitry may be present for implementing more than two regulators.

In operation, register 300 stores supply voltage values corresponding to processor 1 104. For example, in one embodiment, register 300 stores two supply voltage values for processor 1 104, a higher supply voltage value (such as, for example, 1.4) and a lower supply voltage value (such as, for example, 1.2). Therefore, depending on the value of Vcontrol 1 (e.g. whether it is asserted or deasserted), MUX 306 provides the appropriate supply voltage value from register 300 to regulator 1 124. In this manner, regulator 1 124 may output V1 corresponding to the supply voltage value that was stored in register 300 and indicated by Vcontrol 1. Similarly, register 302 stores supply voltage values corresponding to processor 2 112. For example, in one embodiment, register 302 stores two supply voltage values for processor 2 112, a higher supply voltage value (such as, for example, 1.4) and a lower supply voltage value (such as, for example, 1.2). Therefore, depending on the value of Vcontrol 2 (e.g. whether it is asserted or deasserted), MUX 308 provides the appropriate supply voltage value from register 302 to regulator 2 126. In this manner, regulator 2 126 may output V2 corresponding to the supply voltage value that was stored in register 302 and indicated by Vcontrol 2.

Register 304 stores a supply voltage value or values corresponding to deep sleep mode (or standby mode). Therefore, when Standby 1 is asserted, the value of register 304 may be provided, via MUX 310 to regulator 1 124. When standby 2 is asserted, the value of register 304 may be provided, via MUX 312 to regulator 2 126. In alternate embodiments, register 304 may include two values, one corresponding to a supply voltage value during standby for processor 1 104 and another for processor 2 112. Alternatively, register 304 may include more values such that multiple values may be stored corresponding to processor 1 104 during standby mode, where the particular values may be indicated by Vcontrol 1 (as was described above). Similarly, register 304 may include more values such that multiple values may also be stored corresponding to processor 2 112 during standby mode, where the particular values may be indicated by Vcontrol 2 (as was described above). Therefore, in some embodiments, Vcontrol 1 may also be provided to MUX 310 and Vcontrol 2 may also be provided to MUX 312, such that the output of MUX.310 depends on both Vcontrol 1 and Standby 1, and the output of MUX 312 depends on both Vcontrol 2 and Standby 2. Note that in alternate embodiments, different configurations of digital control module 128 may be used. For example, MUXes 306, 308, 310, and 312 may be replaced with any other type of circuitry which provides appropriate information to regulator 1 124 and regulator 2 126 based on Vcontrol 1, Vcontrol 2, Standby 1, or Standby 2, or any combination thereof.

Digital control module 128 is also bidirectionally coupled to IC 102 via digital communications signals. In one embodiment, registers 300, 302, and 304 may be programmed as desired via these digital communications signals. In one embodiment, these registers are set upon reset of data processing system 100. They may also be dynamically changed during operation of data processing system 100. Note also that once the registers are set up, power management unit 122 is able to change supply voltages faster during operation of data processing system 100, as compared to known methods which must communicate through an SPI or I$^2$C channel each time a change in supply voltage is needed. That is, once the registers are set up, a communications channel does not need to be re-established each time a change in supply voltage is desired. Furthermore, this can be accomplished through the use of a compact interface (such as by using signals Vcontrol 1, Vcontrol 2, Standby 1, and Standby 2). Furthermore, the supply voltage levels can be predefined within registers and need not be fully written each time as in the SPI or I$^2$C methods. That is, the values can already be present in the registers when they are needed. Also, it can be appreciated how, for example, the embodiment of FIGS. 1–3 allow for the ability to control the supply voltages such as V1 and V2 without requiring a core or processor being active. That is, V1 and V2 can be controlled via voltage control module 144 when either one or both of processor 1 104 and processor 2 112 are in active.

Note that FIG. 3 illustrates the use of three registers to store supply voltage values. However, note that in alternate embodiments, a different number of registers having a different configuration may be used instead. For example, more or fewer registers may be used. Alternatively, other types of storage circuitry may be used and the registers or other storage circuitry may located elsewhere within power management unit 122 or elsewhere within data processing system 100. Also, although the embodiment of FIG. 3 described each of registers 300, 302, and 304 as storing the value (such as 1.4, 1.2, etc.) of the supply voltage, alternate embodiments may store different types of values used to indirectly indicate different supply voltages to be output by the regulators.

Figure 4:
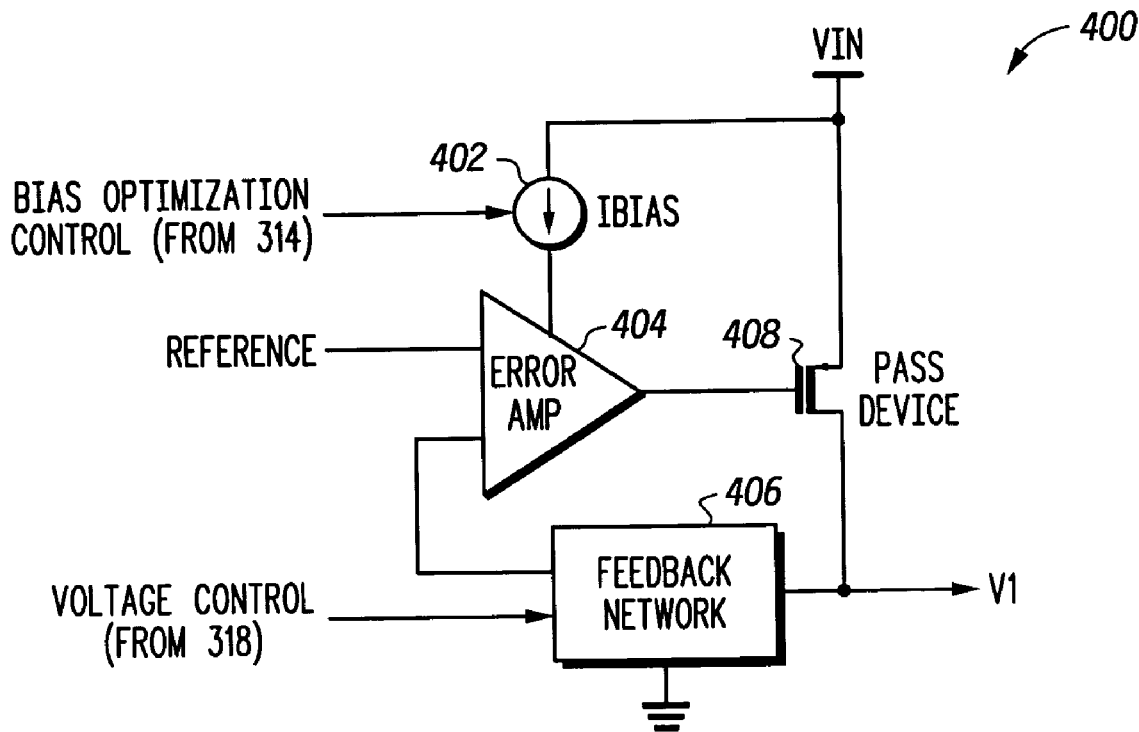
FIG. 4 illustrates, in block diagram form, one embodiment of a linear voltage regulator which may be used in the power management unit of FIG. 3.

FIG. 4 illustrates one embodiment of a regulator 400 which may be used as regulator 1 124 or regulator 2 126 (or both) in the system of FIGS. 1 and 2. Regulator 4 is a linear regulator having a current source 402, an error amplifier 404, a feedback network 406, and a pass device 408. A first current electrode of pass device 408 and a first terminal of current source 402 are coupled to a supply voltage VIN. A second current electrode of pass device 408 is coupled to feedback network 406 and provides the output supply voltage V1. A second terminal of current source 402 is coupled to a control input of error amplifier 404 to provide a current IBIAS, and a control input of current source 402 receives bias optimization control signal (such as from conductor 314). Error amplifier 404 has a first input coupled to receive a reference, a second input coupled to feedback network 406, and an output coupled to a control electrode of pass device 408. Feedback network 406 also receives a voltage control signal (such as from conductor 318) and is coupled to ground.

In operation, based on the value from MUX 306, pass device 408 attempts to maintain V1 at the desired supply voltage level (indicated by the voltage control signal from MUX 306). For example, if output V1 begins to drop, due, for example, to load conditions, then error amplifier 404 raises the voltage on the control electrode of pass device 408 such that pass device 408 increases the voltage level of V1. In one embodiment, VIN is therefore set to a high enough level to ensure that pass device 408 operates in its linear region. Error amplifier 404 is an operational amplifier which attempts to maintain its inputs (the reference and the input from feedback network 406) at a same level, thus providing the appropriate voltage to the control electrode of pass device 408. The reference input to error amplifier 404 may be provided from an off-chip bandgap signal, and is therefore a known value.

Feedback network 406 may be implemented, for example, as a resistor divider, as known in the art. Furthermore, feedback network 406, based on the voltage control signal received from MUX 306, may provide one of a plurality of voltage values. For example, feedback network 406 may be a resistor chain with feedback taps to set its output to different levels, as known in the art. Furthermore, the bias optimization control signal from MUX 310 (and thus based on a standby signal such as Standby 1) can be used to conserve power. For example, in standby mode (i.e. deep sleep mode), the current drive of V1 generally drops, and therefore, error amplifier 404 need not operate with as much strength. Therefore, based on the bias optimization control signal, the IBIAS current may be reduced to save current. Also, IBIAS can be modified during operation based on the bias optimization control signal or other signals (not shown) in order to optimize driving capabilities of regulator 400. Note that in alternate embodiments, different linear regulators, as known in the art, may be used. Also, note that regulator 400 may be designed in a variety of different ways, as known in the art, and FIG. 4 provides only one example.

Figure 5:
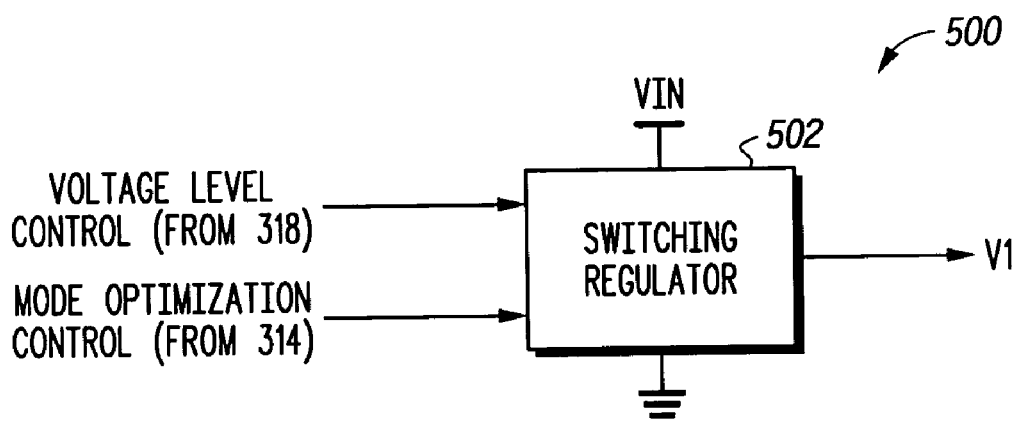
FIG. 5 illustrates in block diagram form, one embodiment of a switching voltage regulator which may be used in the power management unit of FIG. 3.

FIG. 5 illustrates a regulator 500 which may also be used as regulator 1 124 or regulator 2 126 of FIGS. 1 and 2, in accordance with an alternate embodiment of the present invention. Regulator 500 includes a switching regulator 502. Any switching regulator as known in the art may be used as switching regulator 502, where switching regulator 502 is coupled to VIN (an input supply voltage) and ground. In the illustrated embodiment, switching regulator 502 receives a voltage level control signal (which may correspond to the output of MUX 306 provided via conductor 318) and a mode optimization control signal (which may correspond to the output of MUX 306 provided via conductor 314).

In operation, the switches within switching regulator 502 may include capacitor and FET switches which may be controlled by an internal oscillator. For example, the voltage level control signal may be used to set V1 according to the desired supply voltage level. The mode optimization control signal may indicate to switching regulator 502 when, for example, IC 102 is in deep sleep mode or standby mode or may indicate to switching regulator 502 when other conditions are present in which the mode of switching regulator 502 can be changed. For example, via the mode optimization control signal, the current load for switching regulator 502 may be optimized by, for example, adjusting the frequency of the internal oscillator or by indicating to switching regulator 502 that it can enter a skipping mode in which the internal oscillator is turned on and off (i.e. a pulse skipping mode). Also, when in deep sleep mode or standby mode, as can be indicated by the mode optimization control signal, switching regulator 502 can be reconfigured into a linear regulator to further conserve power. Generally, operation and design of a switching regulator is known in the art and a variety of different types and designs of switching regulators may be used. Furthermore, these switching oscillators can be designed such that a mode optimization control signal can be received to allow it to be placed into different modes.

It can now be appreciated how the use of interface signals such as Vcontrol 1, Standby 1, Vcontrol 2, and Standby 2 may be used to control the supply voltages, such as V1 and V2, while requiring less power and not having to rely on a processor within IC 102 being active. For example, storage circuitry (such as, for example, registers) within power management unit 122 may be used to store different supply voltages that are controlled by voltage control module 144 via Vcontrol and Standby signals, as was described above. Furthermore, the control of the supply voltages described herein can be done without software intervention. Therefore, in one embodiment, voltage control module 144 can operate when no other processors are active (e.g. such as when processors 104 and 112 are inactive), unlike known methods used today which must communicate through a communication channel such as an SPI or I²C channel each time a change in supply voltage is needed, thus requiring at least a core to be active. The embodiments described above also prevent the need to establish a communication channel (such as the SPI or I²C channel) prior to each desired change in supply voltage, thus resulting in improved operation. In alternate embodiments having more than two processors, any number of signals such as the Vcontrol and Standby signals may be used with voltage control module 144 and power management unit 122, as were described above, to allow for an improved method to control any number of supply voltages.

Also note that in alternate embodiments, different signals and indicators may be provided to voltage control module 144 other than or in addition to the sleep mode indicators and the processor requested voltage levels described above. In one embodiment, these signals and indicators (such as the sleep mode indicators and the processor requested voltage levels) may be referred to as desired voltage level indicators. That is, in one embodiment, these signals and indicators provide information to voltage control module 144 as to what voltage levels are desired, and voltage control module 144, based on the desired voltage level indicators, can select a voltage level (such as, for example, a voltage level of 1.4, 1.2, or 1.0, as described in the above example) and provide the Vcontrol and Standby signals (indicating this selected voltage level) accordingly. Also note that in one embodiment, the desired voltage level indicator may include only one signal or indicator. For example, each processor may only provide one desired voltage level indicator or may provide multiple voltage level indicators to voltage control module 144.

In the foregoing specification, the invention has been described with reference to specific embodiments. However, one of ordinary skill in the art appreciates that various modifications and changes can be made without departing from the scope of the present invention as set forth in the claims below. For example, the block diagrams and circuitry illustrated herein may have more or fewer elements and may be organized and designed differently, depending on the needs of the data processing system being designed. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The terms a or an, as used herein, are defined as one or more than one. The terms including and/or having, as used herein, are defined as comprising (i.e., open language). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A data processing system, comprising:
a power management unit;
a first processor coupled to said power management unit;
a voltage control module coupled to said power management unit and said first processor for selecting a first voltage level, said voltage control module providing a first control signal and a second control signal to indicate said first voltage level to said power management unit, said power management unit providing a first supply voltage corresponding to said first voltage level to said first processor in response to receiving said first control signal and said second control signal,
wherein:
said first processor provides a first voltage level request to said voltage control module,
said first processor provides a first sleep mode indicator to said voltage control module, and
said first control signal is based on said first voltage level request and said first sleep mode indicator, and said second control signal is based on said first sleep mode indicator.

2. The data processing system of claim 1, further comprises control storage circuitry which stores the first voltage level request from said first processor.

3. The data processing system of claim 1, further comprising a second processor which provides a second voltage level request and a second sleep mode indicator to said voltage control module.

4. The data processing system of claim 3, wherein said first control signal is based on said first voltage level request, said first sleep mode indicator, said second voltage level request, and said second sleep mode indicator, and wherein said second control signal is based on said first sleep mode indicator and said second sleep mode indicator.

5. The data processing system of claim 4, wherein said power management unit comprises a regulator, said regulator providing said first supply voltage to said first processor and said second processor.

6. The data processing system of claim 3, wherein said voltage control module selects a second voltage level and provides a third control signal and a fourth control signal to indicate said second voltage level to said power management unit, said power management unit providing a second supply voltage corresponding to said second voltage level to said second processor in response to receiving said third control signal and said fourth control signal.

7. The data processing system of claim 6, wherein said power management unit comprises a first regulator and a second regulator, said first regulator providing said first supply voltage to said first processor and said second regulator providing said second supply voltage to said second processor.

8. A data processing system, comprising:
a first processor;
a voltage control module coupled to said first processor, wherein said voltage control module receives at least one desired voltage level indicator from said first processor and, based on the at least one desired voltage level indicator from said first processor, provides a first control signal and a second control signal indicating a first supply voltage level to be provided to the first processor,
wherein:
the at least one desired voltage level indicator from said first processor comprises a first sleep mode indicator and a first requested voltage level provided by the first processor, and
said first control signal is based on said first sleep mode indicator and said first requested voltage level, and said second control signal is based on said first sleep mode indicator.

9. The data processing system of claim 8, further comprising a voltage regulator which provides said first supply voltage to said first processor.

10. The data processing system of claim 9, wherein said voltage regulator is capable of being optimized based on at least one of said first control signal and said second control signal.

11. The data processing system of claim 8, further comprising control storage circuitry which stores said first requested voltage level.

12. A data processing system, comprising:
a first processor:
a voltage control module coupled to said first processor, wherein said voltage control module receives at least one desired voltage level indicator from said first processor and, based on the at least one desired voltage level indicator from said first processor, provides a first control signal and a second control signal indicating a first supply voltage level to be provided to the first processor;
a second processor, wherein said voltage control module is coupled to said second processor and wherein said voltage control module receives at least one desired voltage level indicator from said second processor, wherein:
said at least one desired voltage level indicator from said first processor comprises a first sleep mode indicator and a first requested voltage level provided by said first processor,
said at least one desired voltage level indicator from said second processor comprises a second sleep mode indicator and a second requested voltage level provided by said second processor.

13. The data processing system of claim 12, wherein said first control signal is based on said first sleep mode indicator, said second sleep mode indicator, said first requested voltage level, and said second requested voltage level, and wherein said second control signal is based on said first sleep mode indicator and said second sleep mode indicator.

14. The data processing system of claim 13, further comprising a voltage regulator which provides said first supply voltage level to said first processor and to said second processor.

15. The data processing system of claim 14, wherein said voltage regulator is capable of being optimized based on at least one of said first control signal, and said second control signal.

16. The data processing system of claim 12, wherein said voltage control module provides a third control signal and a fourth control signal indicating a second supply voltage level to be provided to the second processor, wherein:

said first control signal is based on said first sleep mode indicator and said first requested voltage level, said second control signal is based on said first sleep mode indicator;

said third control signal is based on said second sleep mode indicator and said second requested voltage level, and said fourth control signal is based on said first sleep mode indicator.

17. The data processing system of claim 16, further comprising a first voltage regulator which provides said first supply voltage level to said first processor and a second voltage regulator which provides said second supply voltage level to said processor.

18. The data processing system of claim 17, wherein said first voltage regulator is optimizable based on at least one of said first control signal, said second control signal, said third control signal, and said fourth control signal, and said second voltage regulator is optimizable based on at least one of said first control signal, said second control signal, said third control signal, and said fourth control signal.

19. A method of generating supply voltage in a data processing system having a first processor and a second processor, comprising:

receiving a first sleep mode indicator from said first processor;

receiving a first voltage level indicator indicating a first voltage level;

providing a first standby signal based on said first sleep mode indicator;

providing a first control signal based on said first voltage level indicator and said first sleep mode indicator;

providing a first supply voltage to said first processor based on said first control signal and said first standby signal;

receiving a second sleep mode indicator from said second processor;

receiving a second voltage indicator indicating a second voltage level;

providing a second standby signal based on said second sleep mode indicator.

20. The method of claim 19, wherein said first supply voltage has a voltage level different from said first voltage level.

21. The method of claim 19, further comprising:

providing a second control signal based on said second voltage indicator and said second sleep mode indicator;

providing a second standby signal based on said second sleep mode indicator; and providing a second supply voltage to said second processor based on said second control signal and said second standby signal.

22. The method of claim 19, wherein:

said first standby signal is based on said first sleep mode indicator and said second sleep mode indicator, said first control signal is based on said first voltage level indicator, said first sleep mode indicator, said second voltage level indicator, and said second sleep mode indicator, and said first supply voltage is provided to said first processor and said second processor.

* * * * *